Dec. 27, 1955        W. L. BENNINGHOFF ET AL        2,728,327
                SINGLE ROTATION FLUID PRESSURE MOTOR
Original Filed March 27, 1947                    8 Sheets-Sheet 1

INVENTORS:
W. L. Benninghoff
John Thompson, dec'd.
BY Nora Thompson, Admrx.
BY Ray S. Gehr, ATTORNEY Dec. 27, 1955   W. L. BENNINGHOFF ET AL   2,728,327
SINGLE ROTATION FLUID PRESSURE MOTOR
Original Filed March 27, 1947   8 Sheets-Sheet 2

INVENTORS:
W. L. Benninghoff
John Thompson, dec'd
BY Nora Thompson, Admrx.
BY Ray S. Gehr, ATTORNEY.

Dec. 27, 1955   W. L. BENNINGHOFF ET AL   2,728,327
SINGLE ROTATION FLUID PRESSURE MOTOR
Original Filed March 27, 1947   8 Sheets-Sheet 6

Dec. 27, 1955    W. L. BENNINGHOFF ET AL    2,728,327
SINGLE ROTATION FLUID PRESSURE MOTOR
Original Filed March 27, 1947    8 Sheets-Sheet 7

FIG. 17.

United States Patent Office 2,728,327
Patented Dec. 27, 1955

2,728,327

SINGLE ROTATION FLUID PRESSURE MOTOR

William L. Benninghoff, Waite Hill Village, Ohio, and John Thompson, deceased, late of Van Nuys, Calif., by Nora Thompson, Administratrix, Van Nuys, Calif., assignors to The Pipe Machinery Company, Cleveland, Ohio, a corporation of Ohio Original application March 27, 1947, Serial No. 737,500. Divided and this application October 17, 1951, Serial No. 251,682

2 Claims. (Cl. 121—1)

The invention relates to fluid pressure motors and particularly to an improved fluid pressure motor capable of automatic single rotation operation, the present application being a division of our earlier application Serial No. 737,500, filed March 27, 1947, now Patent 2,690,572, issued October 5, 1954.

It is an object of the invention to provide a fluid pressure motor which is capable, even under variable heavy loads of accelerating and decelerating smoothly and which, therefore, is well adapted for intermittent single rotation operation.

Other objects, more or less incidental or ancillary to that stated above will appear in the following description of a specific embodiment of the invention as applied to the power actuation of work piece transfer apparatus.

With the stated objects in view the invention consists in forms, combinations and arrangements of parts and devices hereinafter explained and particularly pointed out in appended claims.

In the accompanying drawings illustrating the exemplary embodiment of the invention.

The motor apparatus herein disclosed and claimed is so intimately associated both structurally and functionally with the work transfer devices that it can best be explained by first briefly describing the transfer mechanism and its associated threading machines.

Referring first to Figs. 1 to 6, there are shown at 11 and 12 two die threading machines, and at 13 a pipe handling or transfer apparatus which is suitably disposed between machines 11 and 12 for their mutual cooperation.

For present purposes a brief general description of one of the threading machines will suffice, such machines being available on the market and a complete detailed disclosure of such a machine being available in the application for United States patent of William L. Benninghoff and Alexander F. Robertson, Serial No. 579,752, filed February 26, 1946, now Patent 2,576,095, issued November 27, 1951.

The machine 11 comprises a bed or frame 14, a threading die 15 rotatably mounted on the bed, the die being of the collapsible chaser type. An electric motor (not shown) serves to rotate the die through suitable gearing enclosed by protective casing 16. A traverse table 17 is slidably mounted on bed 14 and carries a power actuated chuck designated as an entirety by 18. Alternatively (in accordance with prior practice), the rotary die 15 may have a slidable mounting on the frame 14 to be traversed relative to chuck 18. The chuck comprises a frame structure 19 which is open centrally at the top to expose a pair of gripper jaws 20, 20 which are adapted to grip a pipe section when they are moved toward each other and to release it when they are retracted. The chuck is fitted with work guiding and supporting means in the form of frustro-conical rolls 21, 21 which are adjustable toward and from each other to accommodate pipe sections of different diameters. With a chuck of such construction a pipe section can readily be lowered into the chuck and lifted from it when its jaws are retracted. A chuck mechanism of this character is shown in U. S. patent to Benninghoff, No. 2,067,626, as well as in the above noted patent of Benninghoff and Robertson. In addition to the above mentioned electric motor, which drives the die spindle and also effects forward feed of the traverse table 17, various fluid motor means (not shown) are provided to close and open the chuck jaws, effect rapid traverse of the traverse table, engage and disengage the drive clutch of the die and reset the chasers following their collapse at the end of the threading operation. The fluid motors here referred to are, of course, provided with suitable valves to control admission and exhaust of the working fluids, the valves preferably being solenoid operated.

In the operation of the threading machines the sequential movements of the motor driven parts thereof are initiated under the control of the work transfer mechanism, as will later more fully appear. As the threading machine 12 is the same in construction as the machine 11 the same reference characters are applied to both and the above description may be taken as applicable to both machines.

Figure 3:
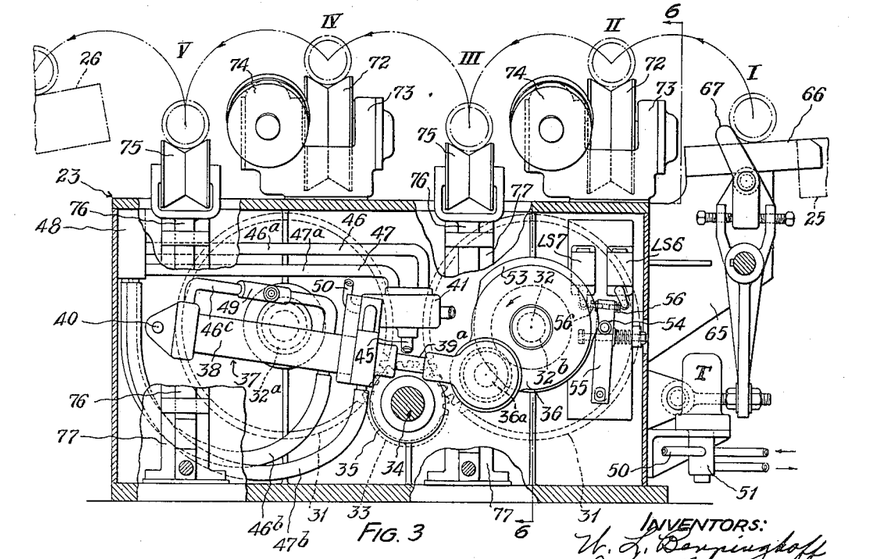
Figs. 3 and 4 are enlarged vertical sections on the lines 3—3 and 4—4, respectively, of Fig. 1.
Figure 4:
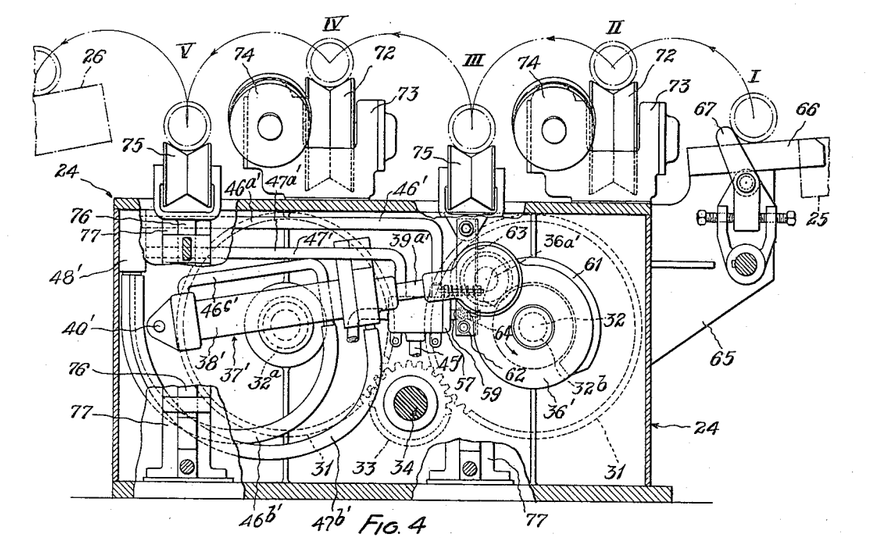

The pipe handling or transfer mechanism 13 comprises a plurality—usually three, four or five—of so-called "stands." The apparatus illustrated comprises three such stands designated generally by the numerals 22, 23 and 24. Each of the three stands includes upwardly exposed pipe-supporting means and transfer devices for effecting lateral movement of the pipes relative to the supporting means. The transfer devices of all three stands are interconnected and driven as a unit by hydraulic motor apparatus which is carried by stands 23 and 24 and constitutes the present invention. As appears from Fig. 1, the three stands are in mutual alignment and disposed in the space between the threading machines 11 and 12. On the receiving sides of the three stands are arranged elevated pipe skids 25, 25 on which the pipe sections to be threaded are presented to the transfer mechanism. On the discharge sides of the stands are arranged elevated delivery skids 26, 26 which receive the pipe sections from the transfer mechanism upon completion of the threading operations. Skids 25 and 26 are preferably inclined downward, the former toward and the latter away from the transfer stands (Figs. 3–5).

Figure 5:
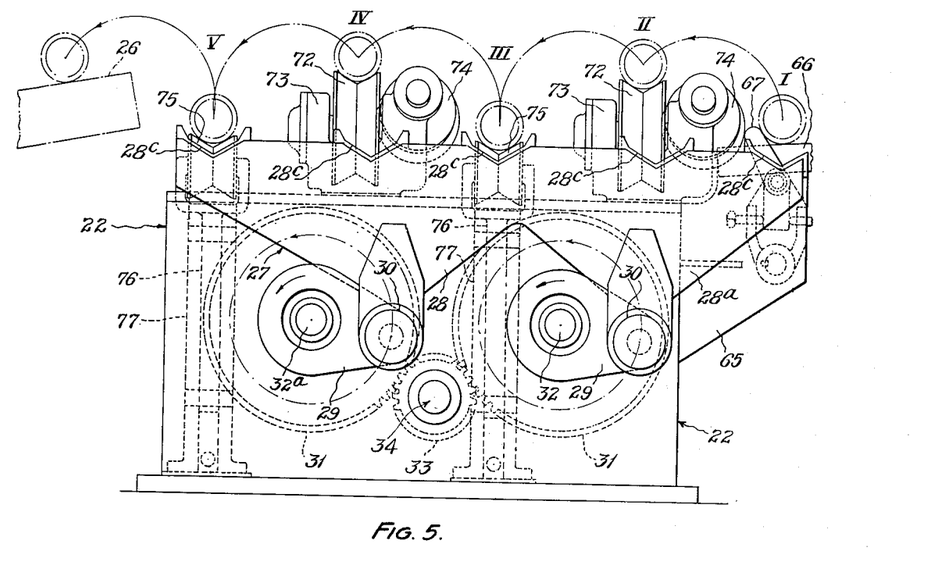
Fig. 5 is an enlarged elevation of the end of the work transfer mechanism adjacent line 5—5 of Fig. 1.
Figure 6:
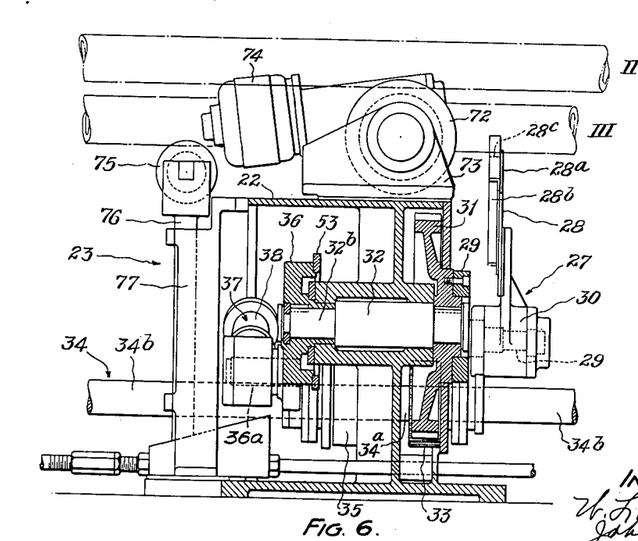
Fig. 6 is a fragmentary sectional view on the broken line 6—6 of Fig. 3.

Each of the stands 22, 23 and 24 comprises a frame and casing structure on or in which are supported the pipe transfer means which are designated generally by the numeral 27 and which comprise in the case of each stand a lifting structure or carrier 28 and a pair of crank arms 29 (Fig. 5) which support and move the carrier, the carrier being fitted with depending bearings 30 mounted upon the pins of the crank arms (Figs. 5 and 6). Each carrier 28 comprises a plate 28a and stiffening angle strips 28b extending around the edges of the plate, the top edge of the carrier being formed with a series of five V-notches 28c. The crank arms 29 are fixedly attached to gear wheels 31, 31, which are keyed on shafts 32, 32a having bearing supports in the stand frame structure (Fig. 6), the assembled shafts 32, 32a, gears 31, 31, crank arms 29, 29 and their pins constituting pairs of cranks upon which the carriers 28, 28 are supported. The two gears 31, 31 are operatively connected by a pinion 33 and such pinions 33 of the three stands are mounted on and interconnected by a shaft structure 34 which comprises, in each stand, a shaft section 34a rotatably supported in bearings 35 and carrying the pinion 33. The shaft structure 34 further comprises long shaft sections 34b which serve to operatively connect the three sections 34a.

The V-notches of the three carriers 28 are similarly spaced across the top edges of said carriers and, with corresponding notches of the several carriers in alignment (Fig. 1), provide three points of support for each of five pipe sections. With the transfer devices of the several stands operatively interconnected by the shaft means 34 the gear wheels 31, 31 of all of the stands may be caused to rotate in unison so that the three pairs of crank arms 29, 29 cause a movement of the carriers 28 such that each point in each carrier (for example the point of each V-notch 28c) follows a circular path and the carrier is maintained in parallelism throughout its circular movement. Thus a pipe section supported in corresponding notches of the three carriers will move laterally in a circular arc with said carriers.

The rotation of the gears 31, 31 is effected by our improved motor apparatus which will now be described and which comprises two out-of-phase reciprocating piston motor units which are arranged to drive cranks disposed less than 180° apart and preferably 90° apart angularly, the cranks being interconnected to turn in unison. It is quite possible to arrange the arms of the two driven cranks on the same shaft but for the drive of the transfer mechanism herein disclosed it is advantageous and preferable to mount them on two of the shafts 32 in separate stands 23 and 24, each with its hydraulic driving unit. Except for the valve control means of the two hydraulic motor units the motor drive units are alike and in the description which immediately follows reference numerals applied to the motor parts of stand 23 will be applied, with prime marks added, to the corresponding parts in stand 24, reference being had to Figs. 3 and 4.

In the case of stands 23 and 24 the shaft 32 as shown in Fig. 6 has an extension 32b on which is keyed crank arm 36 (or 36′) carrying crank pin 36a (or 36a′) which is connected to be driven by hydraulic motor unit 37 (or 37′) comprising cylinder 38 (or 38′), a piston 39 (or 39′) and piston rod 39a (or 39a′). Cylinders 38, 38′ are each mounted at one end on a trunnion 40 (or 40′) carried by the stand structure and the outer end of the piston rod is directly connected to the pin 36a (or 36a′) of crank arm 36 (or 36′). Thus motor unit 37 in stand 23 (Fig. 3) has its piston rod connected to a crank consisting of shaft 32, 32b, arm 36 and pin 36a while motor unit 37′ in stand 24 (Fig. 4) has its piston rod similarly connected to a crank consisting of a shaft 32, 32b, arm 36′ and pin 36a′, the two cranks being 90° out-of-phase and interconnected to be turned in unison by the two motor units.

Working fluid, preferably liquid, is supplied to the two ends of cylinder 38 by means of a four-way valve device 41 comprising a spool valve member 42, actuating piston 43 and spring 44 (Fig. 14), such valves being well known. Liquid under pressure entering through conduit 45 will be directed, according to the position of spool 42, through conduit 46 or conduit 47. Conduit 46 (see Fig. 3) comprises a rigid section 46a leading to a fitting 48, a flexible section 46b and a second rigid section 46c which leads into the pivoted end of cylinder 38. Conduit section 46c carries a one-way flow restrictor 49, which comprises a check valve 49a (see Fig. 16) that opens freely and an adjustable restricting valve 49b arranged in parallel with the check valve. The device permits free flow into cylinder 38 while restricting the discharge flow therefrom. Conduit 47 comprises a rigid section 47a leading from valve 41 to fitting 48 and a flexible section 47b leading from said fitting to the crank end of cylinder 38.

Fluid pressure for actuating the spool member 42 of valve 41 is led to valve 41 through conduit 50 which is controlled by a three-way valve 51 actuated by solenoid T subject to controlling means which will later be described. When fluid pressure is applied to piston 43 of valve 41 the spool 42 is moved against the tension of spring 44 of said valve and when the piston chamber of the valve is opened to exhaust through valve 41 spring 44 moves the spool in the opposite direction.

The crank arm 36 of stand 23 (Fig. 3) carries a cam 53 and a follower 54 mounted on a lever 55 pivotally supported at its lower end and carrying contacts 56, 56 at its upper end arranged to actuate the arms of limit switches LS6 and LS7, these switches constituting part of the automatic control system of the apparatus which will later be described.

Figures 14, 15, 16:
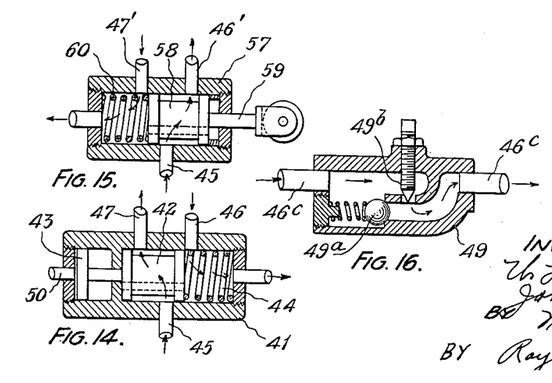
Fig. 14 is a longitudinal sectional view of the fluid operated control valve of one of the cylinders of the last-named motor apparatus.
Fig. 15 is a longitudinal sectional view of the cam operated control valve of a second cylinder of the same motor.
Fig. 16 is a longitudinal sectional view of a one-way restrictor valve constituting a part of the same motor.

In the case of the hydraulic motor unit 37′ of stand 24 (Fig. 4) the admission of pressure fluid to the motor is controlled by a four-way valve 57 which is of the same general character as valve 41 but is constructed and arranged to be actuated mechanically instead of hydraulically. Accordingly valve 57 comprises spool valve member 58, an actuating rod 59 and actuating spring 60 (Fig. 15). To move the valve spool 58 against the tension of spring 60 a cam 61 is mounted on crank arm 36′ and has a follow roller 62 mounted on the lower end of a lever 63 which is pivoted at its upper end and carries a contact member 64 to actuate the valve rod 59 in one direction, while spring 60 serves to move the valve spool in the opposite direction. In most other respects valve 57 and its connections to its motor cylinder 38′ are the same as in the case of the corresponding parts of stand 23 and comprise conduit sections 45′, 46a′, 46b′, 47′, 47a′, 47b′, 46c′ and fitting 48′. No restrictor device is provided for motor unit 37′.

It will, of course, be understood that the inlet ports of valves 41, 51 and 57 are connected by suitable conduits with a source of liquid under pressure. Preferably the apparatus is fitted with a pump and accumulator unit (not shown) to serve as such source and afford pressure fluid for all hydraulic motors of the apparatus, while exhaust ports of the valves (or motors) are connected to the sump from which the pump draws liquid.

It has been pointed out above that the pipe lifting carriers 28 of the several stands 22, 23, 24 are driven in unison through the connections of gears 31, pinions 33 and shaft 34. It will now be apparent that the actuation of one of the gears 31 in each of the two stands 23 and 24 by means of the hydraulic motor units provides a common power drive for the pipe carriers. In a manner which will later be fully explained the hydraulic motor effects intermittent single rotation movements of the carriers.

We come now to consideration of the pipe supporting means provided to support the pipe sections under treatment at several positions or stations which are in turn temporarily occupied by the pipe sections in the operation of the apparatus, there being five such stations in the case of the apparatus shown, which is designed for the threading of both ends of the pipe sections, and these stations correspond to the five notches in the carriers 28.

On the receiving sides of the stands 22, 23 are brackets 65 carrying inclined support rails 66 disposed at a height to receive pipe sections from skids 25 (Figs. 3, 4). The brackets 65 also afford pivotal support for stop levers 67 which project above rails 66 and serve to position a pipe section on the rails ready for transfer by the work-lifting carriers 28. Thus the rails 66, at points adjacent the stop levers 67 afford seats for a pipe section at the initial station of the apparatus.

Figure 1:
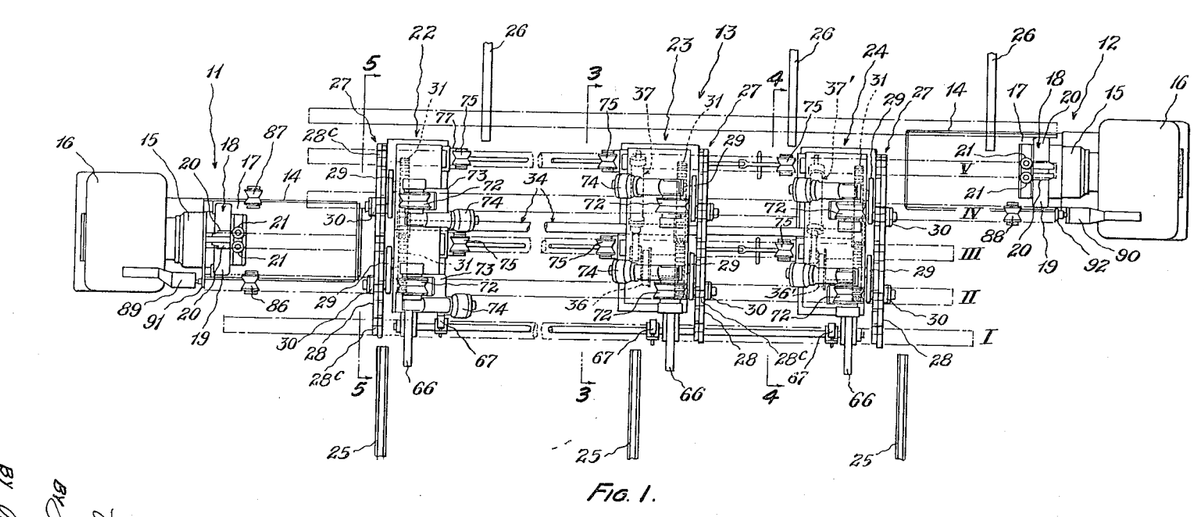
Fig. 1 is a plan view of pipe transfer apparatus within the structure of which the improved motor is supported and enclosed, together with two pipe threading machines which the transfer apparatus is designed to serve.
Figure 2:
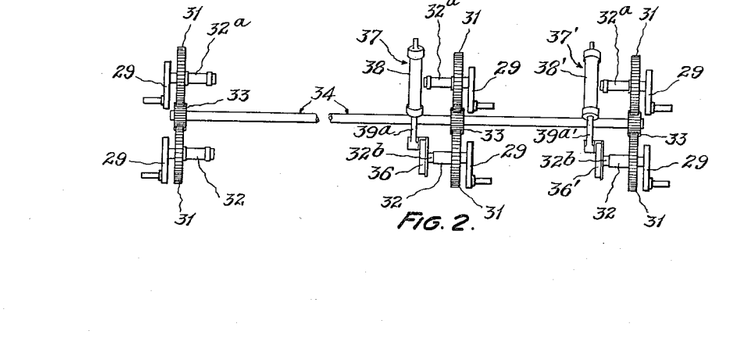
Fig. 2 is a plan view of some of the main parts of the motor constituting the present invention and of the pipe transfer apparatus driven by the motor, the parts illustrated being shown detached from the remainder of the apparatus for clarity of disclosure.

Each of the three stands is fitted with a pair of unitary power rollers 72, 72 each of which has its bearing support in a frame 73 and is driven by an electric motor 74 through worm and wheel gearing (not shown). The rollers 72 have V-groove rims adapted to receive and support pipe sections of various diameters and the three pairs of rollers are aligned in two groups as shown in Fig. 1 and these two groups of rolls constitute pipe section support seats at two additional stations of the apparatus. The three driven rolls adjacent supporting rails 66 are driven in a direction to advance a pipe section resting on them toward threading machine 11, while the second set of power rolls are driven in the reverse direction so as to advance a pipe section resting on them toward the second threading machine 12.

Each of the three stands is also fitted with a pair of idle rollers 75, 75 having V-groove rims to receive and support pipe sections. Each of the rolls 75 is carried on the upper end of a vertical rod 76 slidably supported for vertical adjustment between parallel ribs 77 of the stand structure, the six rollers of the three stands being aligned in two groups as shown in Fig. 1 so as to provide support seats for pipe sections in the two remaining stations of the apparatus.

In Figs. 3–5 pipe sections are shown by dotted lines in the five positions in which the supporting means above described support them and these positions or stations are designated I, II, III, IV and V, respectively. As is indicated in Fig. 5, the notches of the carriers 28 are correspondingly arranged to engage the pipe sections at the five different stations. Thus when a single-rotation movement (in counterclockwise direction, Fig. 5) of the transfer mechanism is carried out the carriers 28 engage pipe sections in the five stations, advancing each pipe section from one station to the next through circular paths indicated by dot-and-dash lines in Fig. 5.

The pipe supports afforded by the two sets of power rolls 72, 72 are supplemented by idle rolls 86 and 87 which are conveniently mounted on the bed frame of machine 11 and by idle roll 88 similarly mounted on bed frame of machine 12. A pipe stop device 89 is mounted on machine 11 in alignment with roller 86 and a similar stop 90 is mounted on machine 12 in alignment with roller 88. The two stops 89 and 90 otherwise are located laterally opposite the dies 15 of the machines 11 and 12, respectively, to secure predetermined positioning of the ends of the work pieces with respect to the transverse planes of the die cutters. These stops 89 and 90 carry actuators 91 and 92, respectively, of switches that constitute a part of the control system of the apparatus, in that said switches must be held in closed position by the endwise adjustment of the pipe sections to permit automatic starting of the transfer mechanism.

Figure 17:
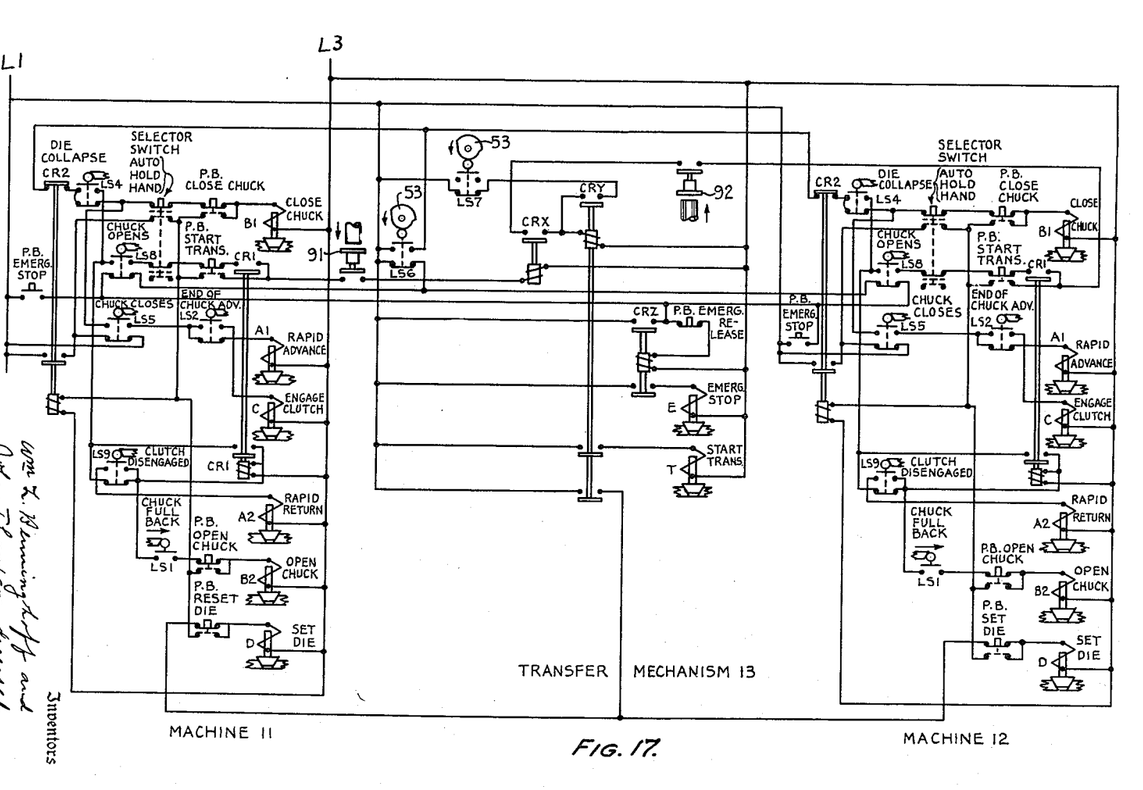
Fig. 17 shows a wiring diagram of the control devices of the said motor and associated apparatus.

Operation of the apparatus which has been described, including both the motor and the transfer and threading mechanisms, is controlled to a large extent by electric devices indicated by the diagram shown in Fig. 17. In the diagram the left and right panels or sections thereof show, respectively, the controls for the threaders 11 and 12, while the central panel shows the controls of the transfer mechanism 13. The manner in which the hydraulic motor units are controlled will presently appear.

In Fig. 17 the symbols and terminology used are conventional and the diagram will be understood without detailed description. It will be observed that the devices are connected across two lines, L1 and L3, of a three-phase supply system. Limit switches actuated automatically are designated by the letters LS. Other switches shown are manually operated. Control relays are designated by the letters CR. Solenoids, used chiefly to actuate the valves of fluid pressure motors (air or hydraulic), are designated by letters A, B, C, etc. A number of the solenoids and controls for machine 11 are duplicated for machine 12 and the controls of the latter are designated by the same letters as those of machine 11.

*Operation*

In describing the operation of the motor and associated apparatus reference will be had especially to Figs. 7–13 and 17.

It may be assumed that, due to previous operation of the transfer mechanism, five pipes are in the apparatus, one at each of the five stations I, II, III, IV and V; that the parts of the transfer mechanism are at rest in the positions shown in Figs. 3, 4, 5 and 7 following one of the cyclical movements of the mechanism and that the two machines 11 and 12 have just completed their operating cycles with the opening of their pipe-gripping chucks. At this time the dies of the threading machines are collapsed, the pipe chucks are fully returned and relays CR1 are energized. Also switch LS6 is in closed (lowered) position.

The opening of the pipe chucks actuates the two limit switches LS8 and this energizes relay CRY and interlocking relay CRX, which in turn energizes solenoid T of transfer control valve 51. The energizing of solenoid T moves the control valve 51 to position four-way valve 41 so as to reverse the pressure in the control cylinder 38 existing at the stage indicated in Fig. 7 and thereby produce the condition indicated in Fig. 8 and start rotation of the transfer mechanism. The energizing of control relay CRY also closes a circuit which in turn energizes the two relays D which cause the resetting of the previously collapsed threading dies of machines 11 and 12.

After 2° or 3° rotation of the transfer mechanism the cam 53 associated with power cylinder 38 permits release (opening) of the normally open limit switch LS6 and thereupon control relay CR1 is deenergized. At the end of 5° rotation of the transfer mechanism, the pipe carriers 28 engage the pipe sections at stations III and V and start to lift them off their supporting rollers, the pipe at station I being similarly engaged after 10° rotation. A rotation of 45° (total) brings the parts to positions shown in Fig. 9 with the piston of cylinder 38′ of stand 24 at dead center position and with its control valve 57 moved by its control cam 61 to reverse the pressure in cylinder 38′.

Figure 9:
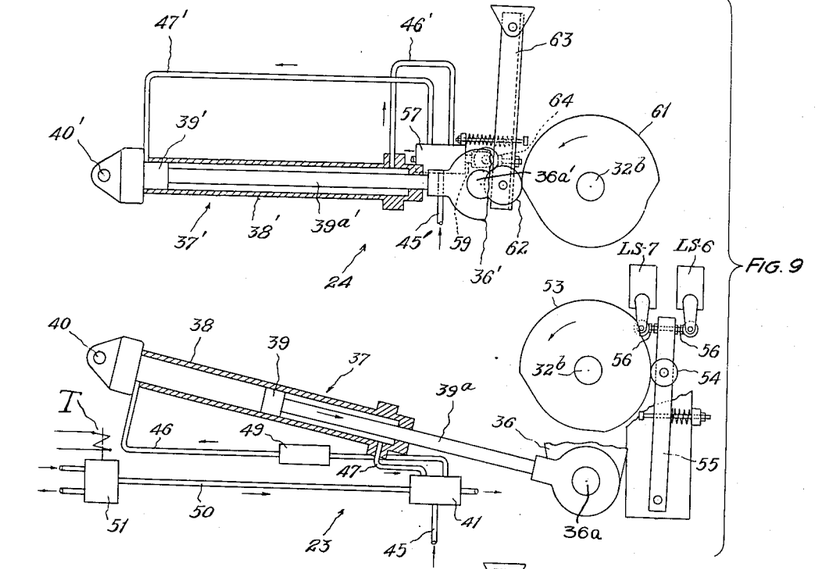
Figure 10:
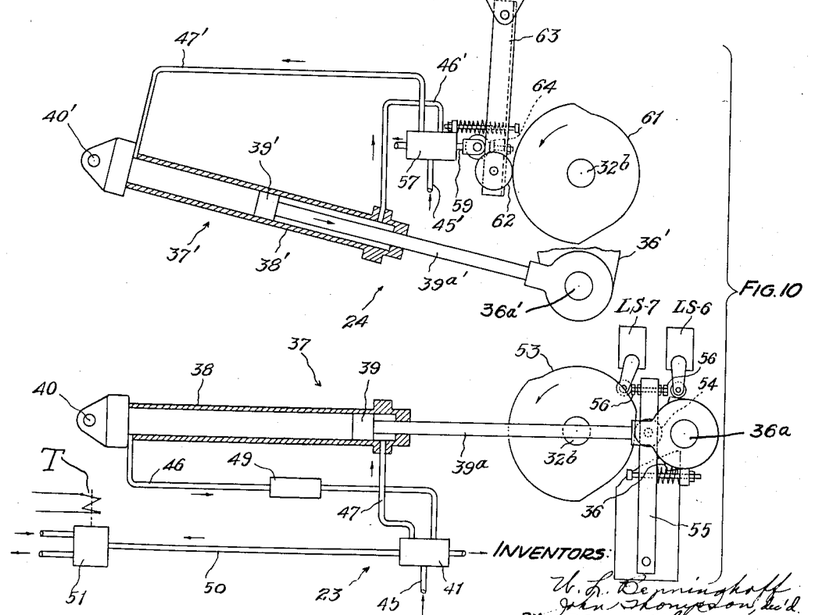

A rotation of the transfer mechanism 10° beyond the position of Fig. 9 brings the pipe carriers into engagement with the pipes at live roll stations II and IV, and continued rotation to 90° beyond the position of Fig. 9 brings the piston of cylinder 38 of stand 23 to dead center position and causes movement of cam roller 54 to open the normally closed switch LS7 which deenergizes relay CRY and solenoid T and reverses valve 51 to shift the four-way valve 41 to reverse the pressure in the cylinder 38 controlled thereby (Fig. 10).

The pressure in motor cylinder 38′ of stand 24 carries the rotation of the transfer mechanism through the dead center position of the piston in cylinder 38 shown in Fig. 10. As the rotation is carried on from the latter position by pressure in both cylinders, and after a total rotation of 145°, the transfer mechanism deposits the pipe lifted from stations I and III upon the continuously driven live rollers at stations II and IV, and at approximately the same time, the pipe lifted from station V is delivered on the discharge skids 26. The two pipes deposited upon the live rollers at stations II and IV, immediately upon contacting the rollers, are moved endwise in opposite directions toward pipe stops 89 and 90, respectively, to effect their endwise positioning preparatory to the next following actuation of the transfer mechanism. This endwise positioning operation proceeds while the transfer mechanism is continuing its movement. When the rotation has continued for another 50° (total rotation of 195°) the pipes removed from stations II and IV, and which had previously been precisely positioned endwise in relation to the transverse planes of the respective cutters of the two machines, are deposited at stations III and V within the open chucks of the two threading machines in position for engagement with the cutters after a minimum slow feed movement.

Figure 11:
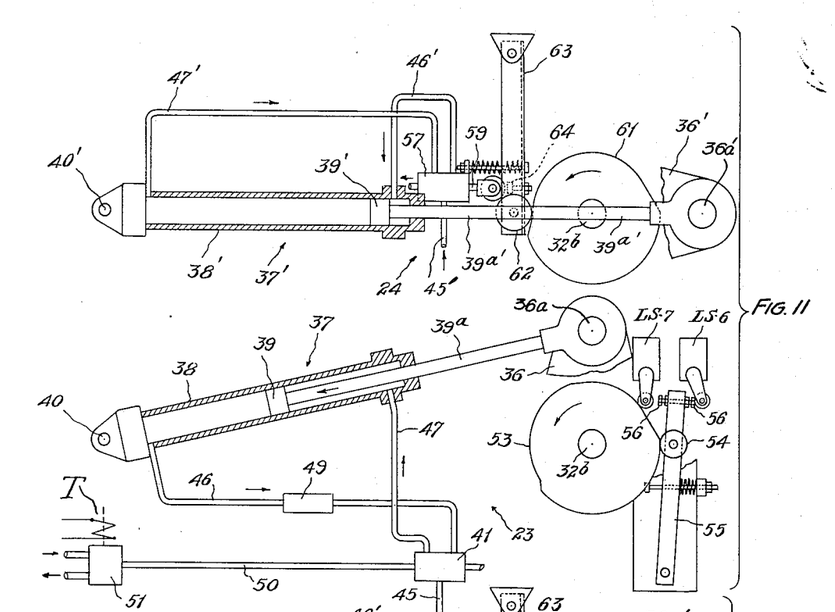

Further 30° rotation of the transfer mechanism brings the hydraulic motor units to the positions shown in Fig. 11. Here the piston of cylinder 38 is at midstroke and the follow roller 54 of the switch-operating cam 53 has just been moved to release the switch LS7 to its normally closed position and close switch LS6 to start the operation of machines 11 and 12. At this point, movement of the control cam of cylinder 38' has permitted shifting of valve 57 as the piston of this cylinder reaches dead center position in order to reverse the cylinder pressure.

Figure 12:
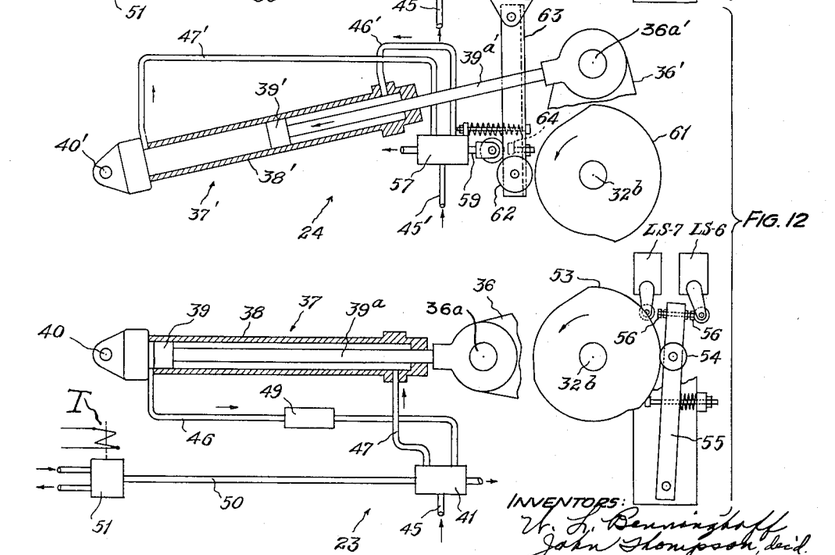

With continued turning of the transfer mechanism from the Fig. 11 position, the piston of cylinder 38 reaches dead center as shown in Fig. 12, but control valve 41 is not shifted and the hydraulic pressure in cylinder 38 thus is brought into opposition to that in cylinder 38' as the piston in the former cylinder reverses its direction. This condition continues in Fig. 13. However, at this time the leverage of the piston in cylinder 38', while less than at the Fig. 12 position, still exceeds that of the piston of cylinder 38 so that the turning of the transfer mechanism is continued, with the leverages of the two cylinders approaching equality. When the parts reach the positions shown in Fig. 7, the pressures exerted by the pistons of the two cylinders 38 and 38' are equal and opposite and the transfer mechanism is brought to rest in its starting position smoothly and without shock, a substantial contribution to this result being supplied by the timing of the hydraulic motor controlling valves so that they bring the carriers to a stop during their rising movement and the action of gravity assists the motor units in overcoming the momentum of the driven parts.

Figure 7:
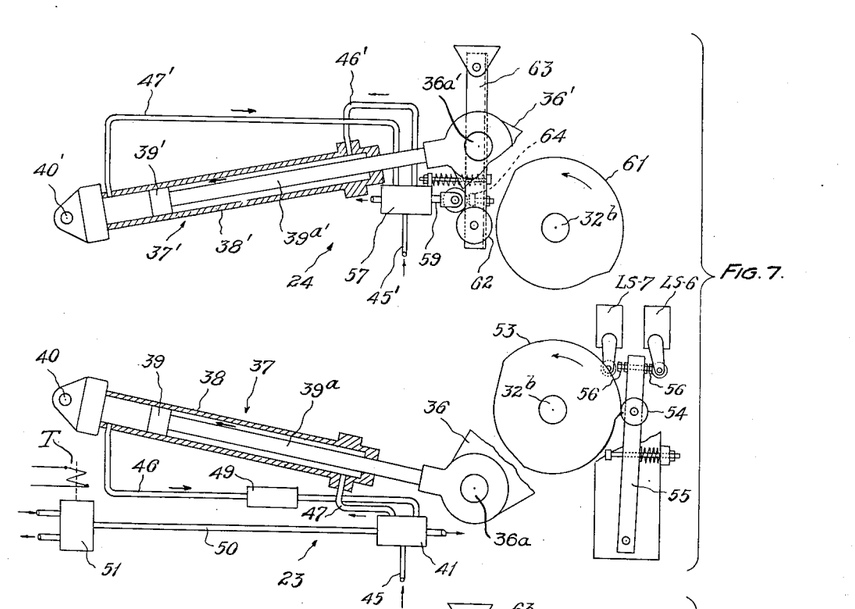
Figs. 7–13, inclusive, are diagrammatic views showing the operational sequence of the multiple cylinder motor apparatus which drives the pipe transfer mechanism and constitutes the present invention.
Figure 8:
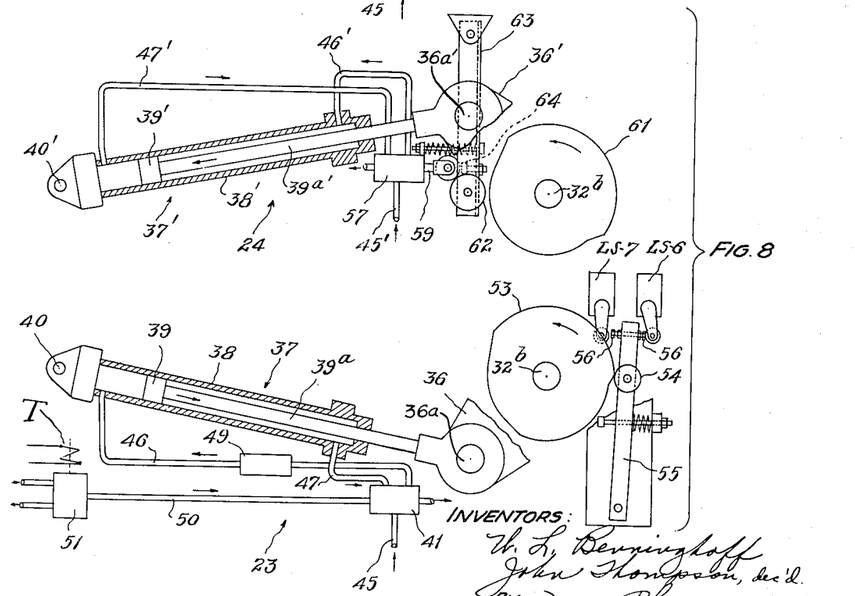
Figure 13:
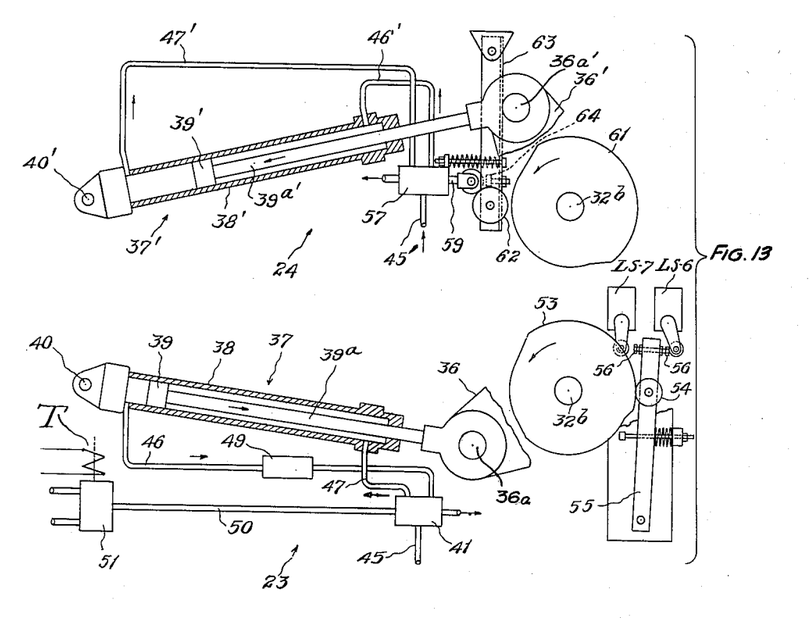

Meanwhile the closing of switch LS6 at the point indicated in Fig. 11, has served to energize solenoids B1 which actuate control valves of the chuck operating motors and thereby initiate operation of machines 11 and 12 which proceeds while the transfer mechanism is completing its cycle through the positions in Figs. 12, 13 and 7. Tracing the operation of the threading machines, the pipe chucks in closing, in turn actuate limit switches LS5 to energize solenoids A1 which actuate control valves to start rapid traverse of the chucks toward the machine dies. At the end of the rapid traverse of the chucks, limit switches LS2 close downward and thereby deenergize solenoids A1 of the rapid traverse control valves. At the same time solenoids C, which actuate valves controlling clutches to initiate slow feed of the work, are energized to start accurate slow feed as the pipe is about to engage the thread cutting chasers of the dies. After the thread has been cut and at the collapse of the thread-cutting chasers, limit switches LS4 are closed. Since pipes are in place in the pipe chucks, cam 53 has stopped in position to move and hold limit switch LS6 down. A circuit is then completed from line L1 through upper contacts of switch LS6 to upper contacts of control relay CR2 (normally closed), thence through upper contacts of limit switch LS4 to lower contacts of limit switch LS9, thence to coil of CR1, raising its armature to close its upper and lower contacts. The lower contacts form a holding circuit to maintain the energization of coil CR1. The opening of the lower contacts of limit switch LS4 deenergizes solenoid B1 and solenoid C, thus starting the disengagement of the feed drive clutches and releasing pilot pressure on a four-way hydraulic valve controlling the pipe chucks. The disengagement of the feed drive clutches operates limit switches LS9 which energizes solenoids A2 and that in turn causes rapid retraction of the pipe chucks. It will be seen that with relay CR1 energized and its lower contact closed, the lines on the right side of switch LS9 are connected to the current source through switch LS4, upper contacts of relay CR2 and switch LS6, the switches LS4 and LS6 being at this time in lowered position and relay CR2 being always in lowered position when the apparatus is operating under automatic control.

Toward the end of the rapid retraction of the machine (pipe) chucks the latter close limit switches LS1 to energize solenoids B2 and thereby open the pipe-gripping chucks, thus completing the cycle of operation and signaling the start of the next cycle.

The specific form of the hydraulic motor apparatus herein disclosed is a preferred form for driving the pipe transfer apparatus shown, but it will be understood that the invention is not limited to the forms shown and that its essential features defined in the appended claims can be embodied in forms of construction differing substantially from that herein shown and described. The construction of the control devices of the motor, in particular, are subject to modification according to the nature of the apparatus to be driven by the motor.

It will be apparent that the particular form of the motor and of the control means therefor herein disclosed is especially well adapted for operation in conjunction with the pipe machining and transfer apparatus disclosed. Such combined subject matter is the subject of claims in the above-identified application Serial No. 737,500, now Patent 2,690,572, issued October 5, 1954.

What is herein claimed is:

1. Intermittent power apparatus comprising a pair of cranks interconnected in out-of-phase relation, a corresponding pair of reciprocating motor units each of which has a cylinder part and a piston part, means for connecting the reciprocating part of one of the two motor units to the pin of one of the cranks and the reciprocating part of the other unit to the pin of the other crank, the interconnected cranks and the motor units connected to them being constructed and arranged for full circular rotation of each crank in one direction, valve devices for controlling admission and exhaust of working fluid to and from the motor cylinders, and means for actuating the valve devices constructed to cause admission of working fluid to the two motor units timed in relation to the rotation of the cranks to cause application of the output forces of the respective motor units to the conneced cranks additively during a portion of each full rotation of the cranks to effect their rotation and oppositely in another part of such rotation in which the leverages of the two motor units on the turning cranks approach and attain equality and thereby automatically stop the rotation.

2. Apparatus as claimed in claim 1 in which the two cranks are about 90° out-of-phase.

References Cited in the file of this patent

UNITED STATES PATENTS

| | | |
|---|---|---|
| 459,525 | Nicholson | Sept. 15, 1891 |
| 490,853 | Littlejohn | Jan. 31, 1893 |
| 1,536,205 | George | May 5, 1925 |
| 1,975,369 | Morrison | Oct. 2, 1934 |
| 1,975,370 | Morrison | Oct. 2, 1934 |
| 2,275,433 | Herold et al. | Mar. 10, 1942 |